United States Patent [19]
Goldston et al.

[11] Patent Number: 5,767,412
[45] Date of Patent: Jun. 16, 1998

[54] PNEUMATIC PRESSURE INDICATOR

[75] Inventors: Mark R. Goldston, Los Angeles, Calif.; Jon L. Bemis, Middleboro, Mass.; Daniel M. Wickemeyer; David Potter, both of Venice, Calif.

[73] Assignee: L.A. Gear, Inc., Santa Monica, Calif.

[21] Appl. No.: 747,220

[22] Filed: Nov. 12, 1996

Related U.S. Application Data

[62] Division of Ser. No. 849,433, Apr. 30, 1992, Pat. No. 5,588,227.

[51] Int. Cl.$^6$ ............................................... G01L 7/06
[52] U.S. Cl. ............................................... 75/729.1
[58] Field of Search ........................ 73/729.1, 729.2, 73/730

[56] References Cited

U.S. PATENT DOCUMENTS

| | | | |
|---|---|---|---|
| 1,403,972 | 1/1922 | Middleton | 73/729.1 X |
| 1,416,814 | 5/1922 | Glickerman | 73/731 |
| 1,489,164 | 4/1924 | Smith | 73/731 X |
| 2,449,953 | 9/1948 | Rippingille | 73/729.1 X |
| 2,702,053 | 2/1955 | Baker | 73/729.1 X |
| 3,249,760 | 5/1966 | Miller | 73/729.1 |
| 3,595,085 | 7/1971 | Harrah | 73/729.1 |
| 3,808,706 | 5/1974 | Mosley et al. | 73/729.1 X |

FOREIGN PATENT DOCUMENTS

| | | | |
|---|---|---|---|
| 644253 | 10/1928 | France | 73/729.1 |
| 44925 | 9/1961 | Poland | 73/729.1 |

Primary Examiner—George M. Dombroske
Assistant Examiner—Paul D. Amrozowicz
Attorney, Agent, or Firm—Graham & James LLP

[57] ABSTRACT

An athletic shoe (20) having an inflatable air bladder (52) integrated into the design and construction of the shoe, and apparatus (50) for inflating the air bladder, as well as apparatus (82) for sensing and indicating the pressure in the bladder, all incorporated into the design of the shoe.

3 Claims, 5 Drawing Sheets

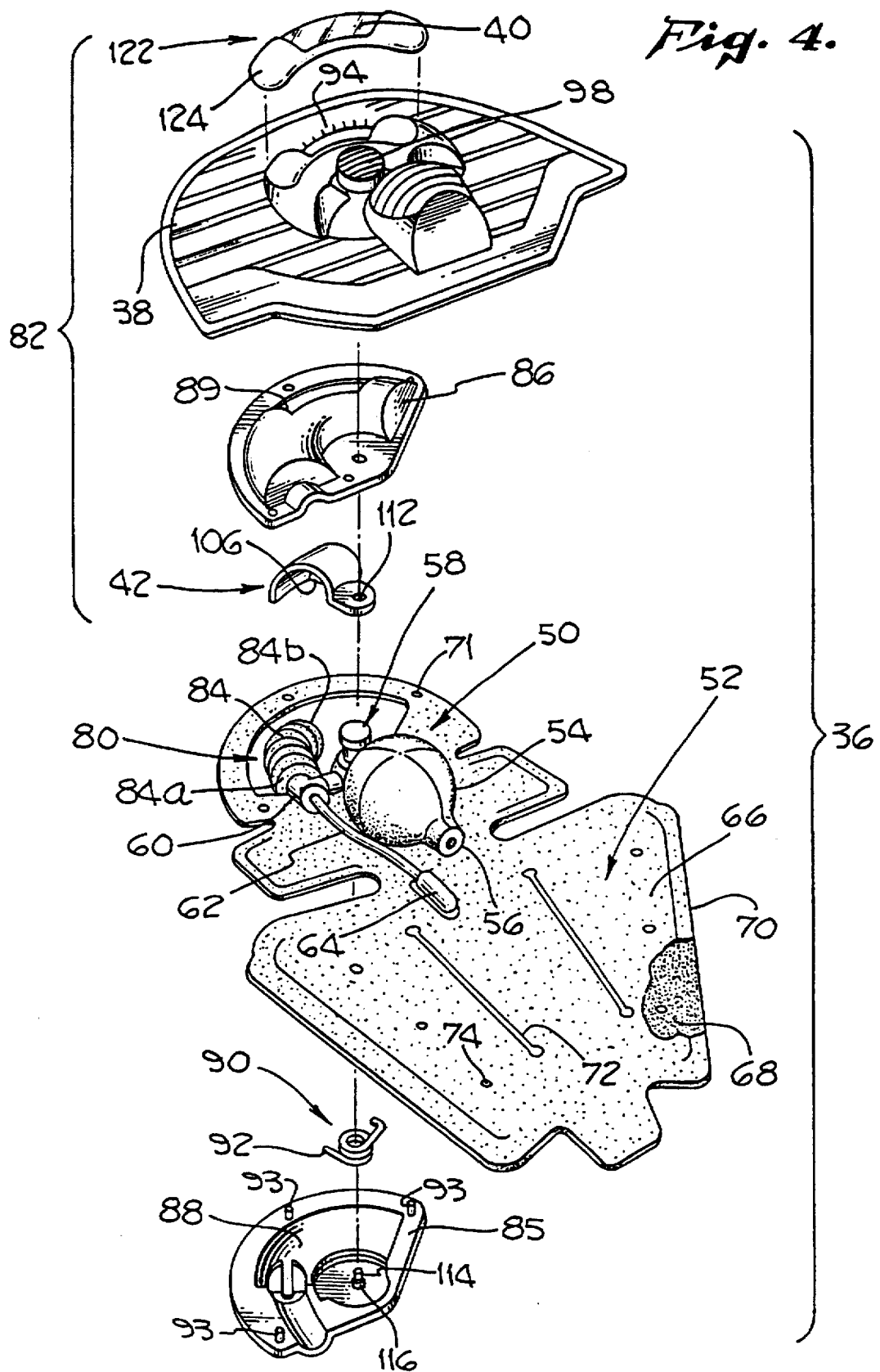

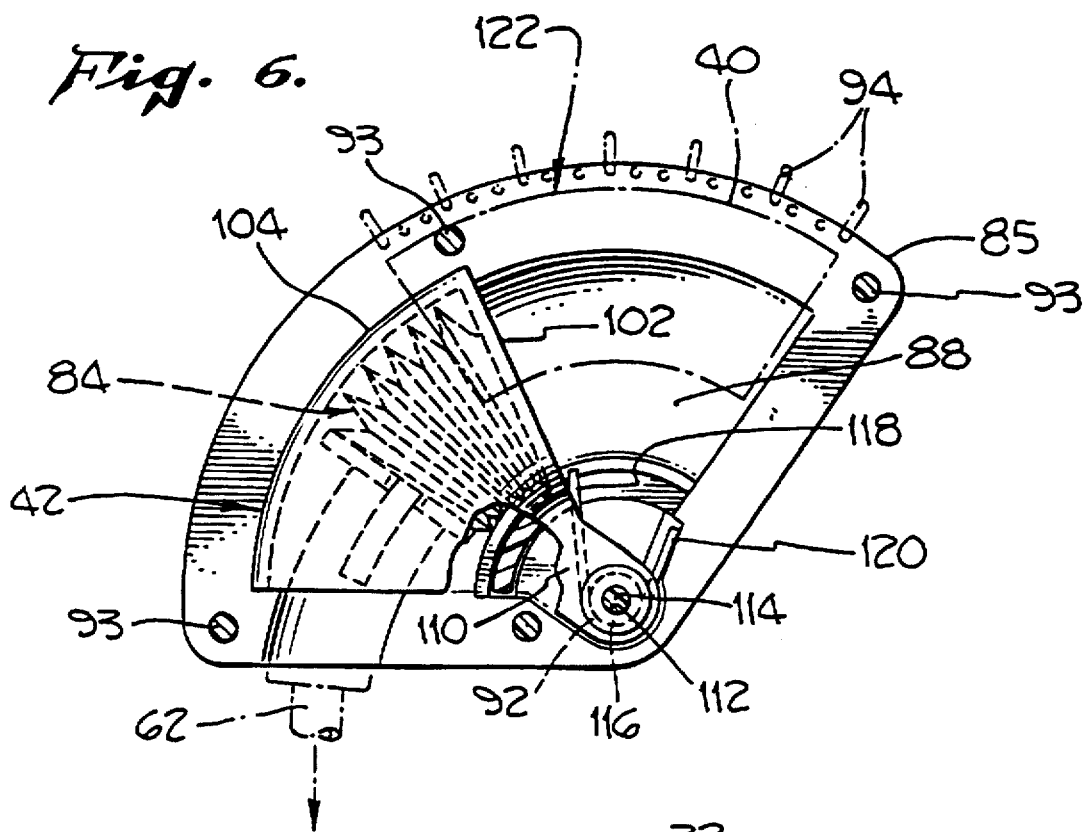

5,767,412

PNEUMATIC PRESSURE INDICATOR

This is a division of application Ser. No. 07/849,433, filed on Apr. 30, 1992, now U.S. Pat. No. 5,588,227.

BACKGROUND OF THE INVENTION

This invention generally relates to the field of footwear, and more particularly to athletic footwear. Specifically, the present invention relates to athletic footwear which incorporate at least one inflatable air bladder for adjusting the comfort and fit of the athletic footwear, and an apparatus for visually displaying the pressure within the inflatable air bladder.

In various types of athletic footwear, and in particular for footwear associated with particular types of athletic events, it is recognized that the comfort and fit of the footwear can affect the athletic performance. In order to increase both the comfort and fit of footwear, manufacturers have incorporated inflatable bladders of various designs into the construction of the footwear. The development, incorporation, and use of inflatable air bladders within athletic footwear was and is particularly appropriate for ski boots used for downhill skiing. Thus, a number of patents relate to the field of ski boots which incorporate inflatable air bladders, for example, German Patent No. 2,162,619, and more recently, U.S. Pat. No. 4,662,087. While the original designs for ski boots having air bladders incorporated the use of an external pressurizing device such as a hand pump, more recent designs incorporate the design of the pump into the article of footwear, such as for example the ski boot of U.S. Pat. No. 4,702,022.

The demands for comfort and snugness of fit in other athletic events has resulted in the use of the inflatable bladders originally developed for ski boots in various types of athletic footwear, including athletic shoes used for basketball and other sports. There are presently available athletic shoes incorporating an air pump, such as depicted within U.S. Pat. No. 5,074,765, to inflate air bladders located within the sole of the shoe, or alternatively, bladders located in portions of the upper or the tongue of the athletic shoe. The advantages of these types of shoes is manifested primarily by their increased comfort and the secure positioning or fit of the foot within the shoe. Another benefit derived from the use of air bladders is the potential for reduction of forces transmitted through the shoe to the foot and ankle of the wearer during performance of the athletic endeavor. Thus, current athletic shoes having incorporated air bladders provide enhanced comfort and fit, while also reducing the occurrence of various types of injuries.

For the athletic shoes currently available which incorporate both the inflatable air bladders and a pump inflation means, the comfort and fit of the article of footwear is adjusted by inflating the air bladder by use of the pump after securing the footwear about the foot. The wearer simply inflates the air bladder until a particular pressure level, or fit, is felt by the foot. However, due to the rigors of various athletic events, and because the human foot tends to swell and contract with varying levels of activity, it is very difficult for the individual to obtain a consistent fit from one use to the next, or to recognize the difference in their performance, based upon a pressure setting for the air bladders that is merely sensed by the foot. This problem is primarily related to the fact that there is no currently available means for indicating the particular pressure to which the user has inflated the air bladder. Thus, it would be beneficial to have a means for indicating the pressure within the air bladder, thereby indicating the particular fit which is most advantageous for enhanced performance. A visual reference to which the user may refer when first affixing the shoe to the foot, prior to a particular athletic use, or alternatively, during use, when it may be desirable to vary or restore a given fit, is therefore desirable.

Accordingly, the present invention is directed to an article of athletic footwear which incorporates inflatable air bladders, and which also includes a pressure sensing means and means for displaying the sensed pressure in the air bladders.

SUMMARY OF THE INVENTION

The present invention provides an athletic shoe which incorporates an inflatable air bladder in the design and construction of the shoe, and means for inflating the air bladder, as well as means for sensing the pressure in the bladder and means for indicating the pressure sensed, all incorporated into the design of the shoe.

More specifically, the article of footwear of the present invention includes an air bladder and an associated pump for inflating the air bladder. In addition, the air bladder is integrally connected to a means for sensing the pressure within the air bladder, and to a means for allowing a visual indication of the pressure sensed therein.

In the preferred embodiment, the means for sensing the pressure is an inflatable, arcuately expanding, bellows. The bellows, which has a first end in open communication with the bladder and a second, closed end, is contained in a partial toroidal chamber, and is disposed beneath a clear plastic lens or window. Inflation of the inflatable bladder using the pump causes the bellows to expand, whereby the closed end of the bellows forces an indicator means across the arcuate length of the lens. The lens is disposed proximate to an indicia of pressure, such as a graduated pressure indicating scale. The scale preferably includes a plurality of markings, such as dashes and dots, spaced about the arcuate length of the lens. By this configuration, as the arcuately expanding bellows is inflated simultaneously with the inflation of the inflatable air bladder, the indicator traverses the scale between an unpressurized position and a fully pressurized position. Thereby, the user may simply affix the shoe to his or her foot, and then use the incorporated pump to inflate the air bladder (and bellows) to a particular pressure level as indicated by the location of the indicator.

By the arrangement of the above assembly of elements, the user of the athletic shoe can inflate the incorporated air bladder(s) to a specifically identifiable pressure. Thereby, the user will be able, through trial and error, to determine the most appropriate pressure setting for any particular athletic endeavor. Thereafter, the user will be able to rapidly inflate or deflate the inflatable bladder to a specific pressure, accurately and repeatably, using the visual pressure indicating means as a pressure indicator, thereby optimizing his or her comfort and performance.

A better understanding of the invention, along with its features and advantages, may be had from a consideration of the detailed description of its preferred embodiments which follows hereinafter, particularly if this description is read in conjunction with the associated drawing figures, a brief description of which now follows.

BRIEF DESCRIPTION OF THE DRAWINGS

FIG. 4 depicts an exploded view of the air bladder, inflating means and pressure indicating means of the present invention.

FIG. 5 depicts a cross-sectional view along line 5—5 of FIG. 2, of the pressure indicating means of FIGS. 1 through 3.

FIG. 6 depicts a partially schematic, partially cut-away view of the bellows and indicator means of the pressure indicating means of the present invention.

DETAILED DESCRIPTION OF THE PREFERRED EMBODIMENTS

Figure 1:
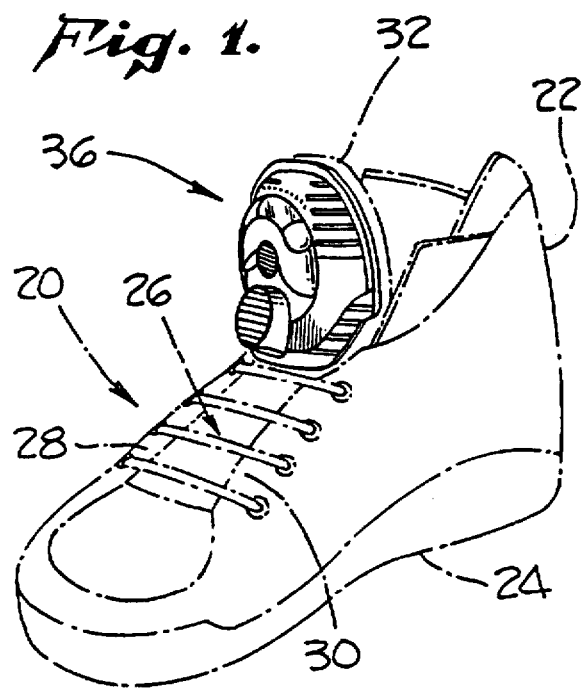
FIG. 1 depicts an article of footwear incorporating the pressure indicating means of the present invention.

FIG. 1 schematically depicts a lace-up athletic shoe 20. The athletic shoe 20 includes an upper 22 and a sole 24. The upper 22 includes a tongue opening 26 which is defined by opposing facing sides, or flaps, 28 and 30. Disposed beneath the opening 26 is a tongue 32 of the upper 22. The tongue 32 generally overlays the instep of the wearer's foot and extends up to the level of the ankle, and in the exemplary embodiment of shoe illustrated, incorporates the pressurizing means 36 of the present invention, as detailed more fully below with respect to the following figures. As illustrated, the pressurizing means 36 of the present invention is preferably located at the top portion of the tongue 32, i.e. proximate the ankle opening of the athletic shoe 20.

Figure 3:
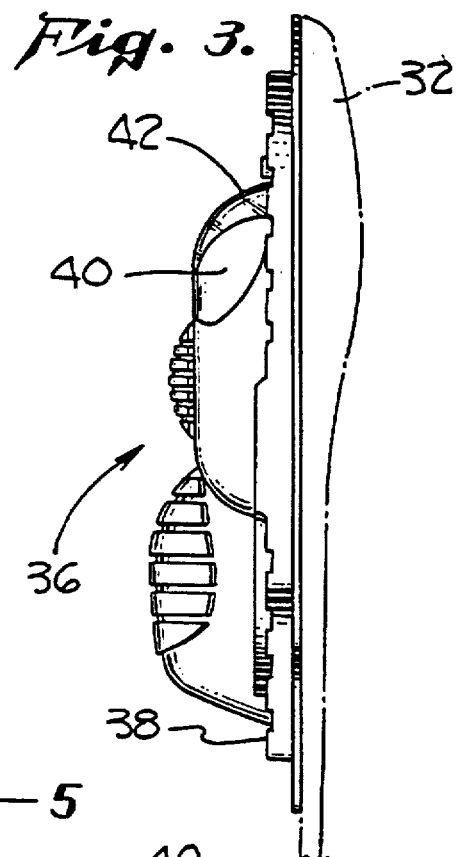
FIG. 3 depicts a side view of the pressure indicating means of FIG. 2.
Figure 2:
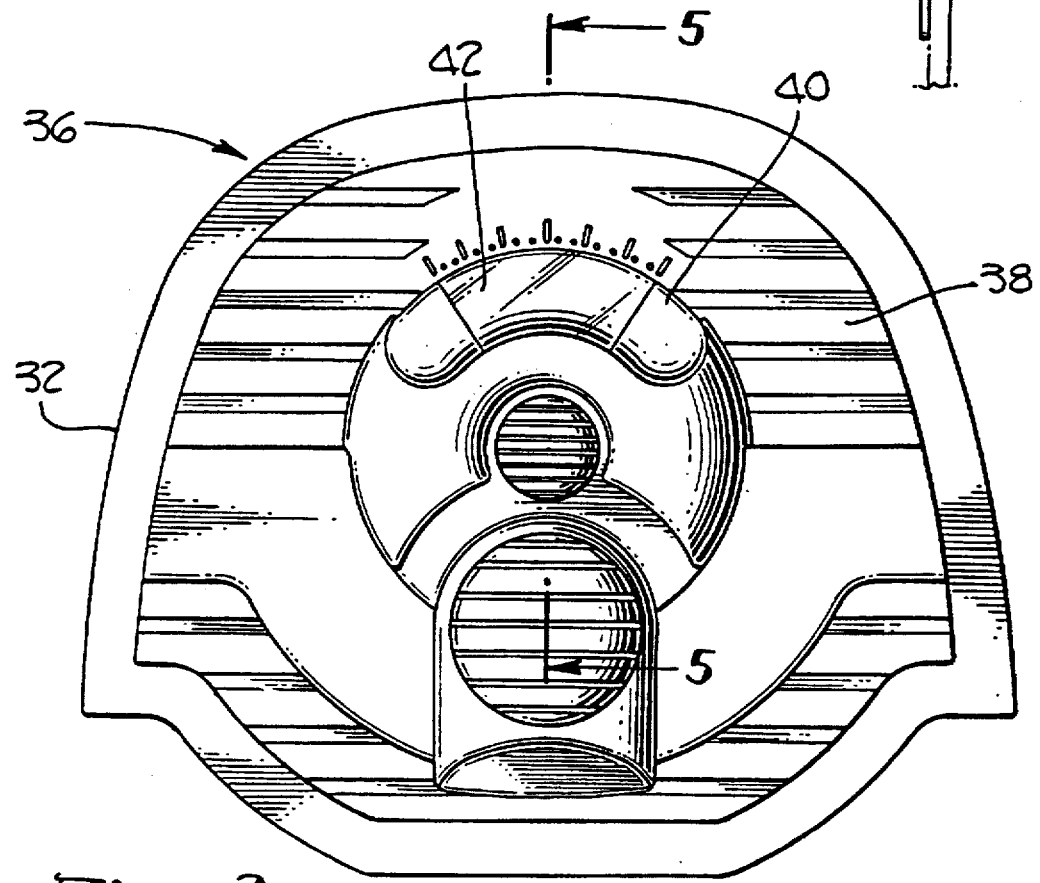
FIG. 2 depicts an enlarged frontal view of the pressure indicating means of the present invention.

FIGS. 2 and 3 depict a frontal perspective view and a side perspective view, respectively, of the upper portion of the tongue 32. As illustrated in FIGS. 2 and 3, the pressurizing means 36 is disposed behind a facing plate 38. The facing plate 38 includes a lens 40 of clear plastic material, which allows viewing of an indicator means 42 disposed beneath the lens 40. Preferably, the facing plate 38 is an article of flexible molded rubber or polyurethane having the particular design features required for covering the various aspects of the pressurizing means 36, as will be defined in greater detail below.

FIG. 4 illustrates an exploded view of the pressurizing means 36 of the present invention. As illustrated in FIG. 4, all of the elements of the pressurizing means 36 may be incorporated into the design of the tongue 32 (FIG. 1) of the present invention. However, it should also be appreciated that various other configurations, including air bladders located at or within other portions of the shoe, may incorporate the design of the present invention.

In FIG. 4, the pressurizing means 36 includes a pump means 50 for inflating a bladder means 52. The pump means 50 may be a simple rubber bulb 54 having an associated one-way inlet valve 56 and a one-way outlet and pressure relief valve 58. Depressing the rubber bulb 54 directs air through valve 56 to a tee-joint 60 and conduit 62 leading to an inflation port 64 of the bladder means 52.

The bladder means 52 is preferably constructed from a pair of air-impenetrable elastomeric sheets, each having a desired precut form, which are bonded or heat-welded together at or near the peripheral edges to form a flexible, air-tight cushion or pillow. Thus, the bladder means 52 includes an upper member 66 and a lower member 68 bonded together at their peripheral edges 70. Additionally, assembly details, such as the fastener openings 71, as well as structural ribs 72 or connection points 74 can be incorporated into the construction of the bladder means 52, e.g., by "heat-stitching", to define other details, such as pockets for inflation associated with particular areas or bone structure of the foot, and/or other features lending structural definition to the resulting cushion.

The pump means 50 and bladder means 52 are also integrally attached pneumatically to a pressure sensing means 80 and means for indicating the sensed pressure 82. The pressure sensing means 80 and means for indicating the sensed pressure 82 combine to provide a visual indication of the pneumatic pressure within the bladder means 52.

In the preferred embodiment, the pressure sensing means 80 comprises a bellows 84 having a first end 84a in open communication with the bladder means 52, and a closed, opposite second end 84b. Preferably, the bellows 84 is configured to be arcuately expanding, as will be described in greater detail below. The bellows 84 is arranged to inflate concurrently with inflation of the bladder means 52, in response to operation of the pump means 50, because the bellows 84 is in continuous pneumatic interconnection with the inflatable portion of the bladder means 52 by way of the bellows' open end 84a.

The means for indicating the sensed pressure 82 preferably comprises a plurality of elements constructed to work in combination to visually display the pressure within the bladder means 52 and bellows 84. In addition to the facing plate 38, lens 40, and indicator means 42, the means for indicating the sensed pressure also includes a main housing 85 disposed behind the bladder means 52 and a lens cover 86 disposed in front of it. When assembled together, the main housing and lens cover combine to define a partial toroidal chamber 88. The lens cover 86 has an arcuate window or opening 89 in it to permit the indicator means 42 to be seen therethrough. A resilient means 90 is provided, preferably in the form of a coil spring 92, to force the indicator means 42 to a retracted position, collapsing the bellows 84, upon release of air from the bladder means 52 by operation of the pressure relief valve 58.

In the preferred configuration illustrated, the main housing 85 and lens cover 86 are assembled together, e.g., by fastener means 93, about the bellows 84 and indicator means 42 to define a partial toroidal chamber 88 containing them. Thus, the bellows 84 can expand within the chamber 88, forcing the indicator means 42 to traverse the toroidal chamber beneath the window 89 and overlying lens 40. An observer looking through the lens 40 will see the indicator means 42 behind it traversing across the arcuate length of the lens 40, and can utilize a number of pressure indicating marks 94, for example, molded into the cover of the facing plate 38, as references to determine the relative pressure within the bellows 84 and bladder means 52.

In an alternative embodiment, the lens cover 86 can be molded of a clear plastic material, in which case, the window 89 can be eliminated, and the lens 40 feature conveniently molded integrally into the lens cover, thereby eliminating an extra piece and some additional assembly.

In operation, depressing the bulb 54 of the pump means 50 causes air to flow through valve 58, tee-joint 60, and conduit 62, into the bladder means 52 and bellows 84, thereby inflating the bladder means 52 and expanding bellows 84. Expansion of the closed end 84b of bellows 84 against the indicator means 42 causes the latter to rotate about its pivot point 96 (see, FIGS. 9 and 10) from a first position to a second position, depending upon the amount of pressure imparted to the bladder means 52 by repetitive depression of the pump means 50. Following any particular depression of the bulb 54, the bulb reinflates due to its inherent elastomeric characteristic while taking in air from ambient via the inlet valve 56.

The pressurized air within the bladder means 52, as well as the bellows 84, can be released by depressing a pressure relief button 98 of valve 58. When the pressure is released, the inherent elastomeric characteristic of the bladder means 52, as well as the pressure being exerted on it by the foot and other portions of the shoe, will cause it to deflate. Additionally, the force exerted by the resilient means 90 (or spring 92) on the indicator means 42 will cause the bellows 84 to deflate and contract, thereby causing the indicator means 42 to traverse from the second position back to the first position beneath the lens 40.

By the above configuration and operation, it may be appreciated that the combination of elements comprising the pressurizing means 36 of the present invention allows the user of the athletic shoe 20 to inflate the bladder means 52 to any particularly desired inflation pressure each time the user wears the athletic shoe 20. Additionally, since placing the shoe 20 on the user's foot and tying the laces of the shoe will determine the initial comfort and fit of the shoe, the pressure indicating means of the present invention is designed to operate somewhat independently of the lacing mechanism. Thus, with the shoe laced to a particular tightness, the inflation of the bladder means will be affected by the tightness of the lacing, and the inflation pressure for the bladder and bellows will reflect the pressure exerted by the lace. The device of the present invention thereby allows a visual indication of the pressure in the bladder means 52. The device also allows the user to visually observe and set the comfort and fit of the shoe 20, dependent only in part on the particular tightness of the lacing thereof.

FIG. 5 depicts a cross-sectional view through the top portion of the tongue 32 taken along the line 5—5 of FIG. 2. As illustrated, the facing plate 38 covers the bulb 54 of the pump means 50, which interconnects with the valve 58, as well as the pressure relief button 98 of valve 58. Also illustrated in greater cross-sectional detail are the lens 40 and an end face 102 of the indicator means 42, as well as the partially cylindrical portion 104 of the indicator means. The end face 102 of the indicator means 42 is partially cut away in the figure to depict the closed end 106 of the bellows 84. Also illustrated in the cross-sectional view are the main housing 85 and the portion of the lens cover 86 that combine to define the partial toroidal chamber 88. Finally, as illustrated, the indicator means 42 also includes an arm portion 110, which extends radially inward from a part-cylindrical portion 104 to define a cylindrical bore 112 about, and mounted to, a pin 114 about which the indicator means 42 is pivotable. In addition, concentrically mounted with the pin 114 is the spring 92, which is mounted about a post 116 and has a first end 118 secured to exert force against the arm portion 110 of the indicator means 42. The opposite end 120 of the spring 92 is positioned to abut against a segment defined by the main housing 85.

Operation of the arcuately expandable bellows 84 is illustrated in FIGS. 6 through 10. In FIG. 6, a partially cutaway, partially perspective view of the arcuately expanding bellows 84, lens 40, and indicator means 42, is illustrated. In this configuration, the bellows 84 is shown in the collapsed or deflated state wherein the arm portion 110 is shown being forced by the spring 92 to cause compaction of the bellows 84. Additionally, FIG. 6 illustrates the arrangement of the lens 40 within a bezel lens member 122, which includes a bezel element 124 (see FIG. 8) into which the lens 40 is affixed. The bezel element 124 provides a surface for affixing the lens 40 over the opening 89 in lens cover 87. Also illustrated is the spring 92, and the portion of the main housing 85 into which the spring 92, pin 114 and post 114 elements are located, relative to the arcuate bellows 84 and lens 40.

Figure 7:
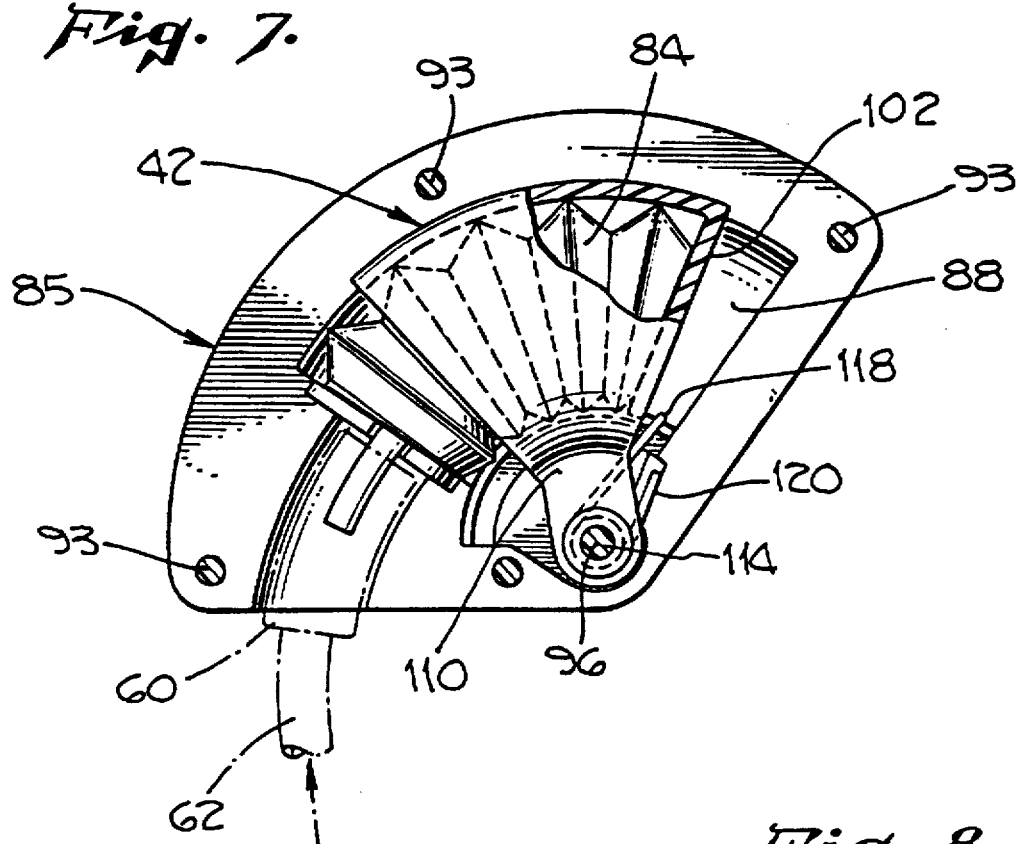
FIG. 7 depicts the bellows in an inflated state for the pressure indicating means of FIG. 6.

FIG. 7 depicts the arcuately expanding bellows 84 in an expanded state, corresponding to a pressurized state for the bladder means 52. In this configuration, the bellows 84 has expanded in an arcuate manner thereby forcing the indicator means 42 to pivot about the centerpoint 96 of pin 114. The indicator means 42 traverses across a portion of the partial toroidal chamber 88, and can be viewed through the lens 40 and opening 89. Thus, by observing where the front edge or wall of the indicator means is located relative to the indicator marks 94, the pressure within the bellows 84 and the bladder means 52 can be determined, and for the relatively low pressure levels in the bladder means that are typically encountered in this type of application, the relationship between the position of the indicator means 42 and the pressure level within the bladder means is fairly linear, with little or no hysteresis in the position of the indicator means.

Figure 8:
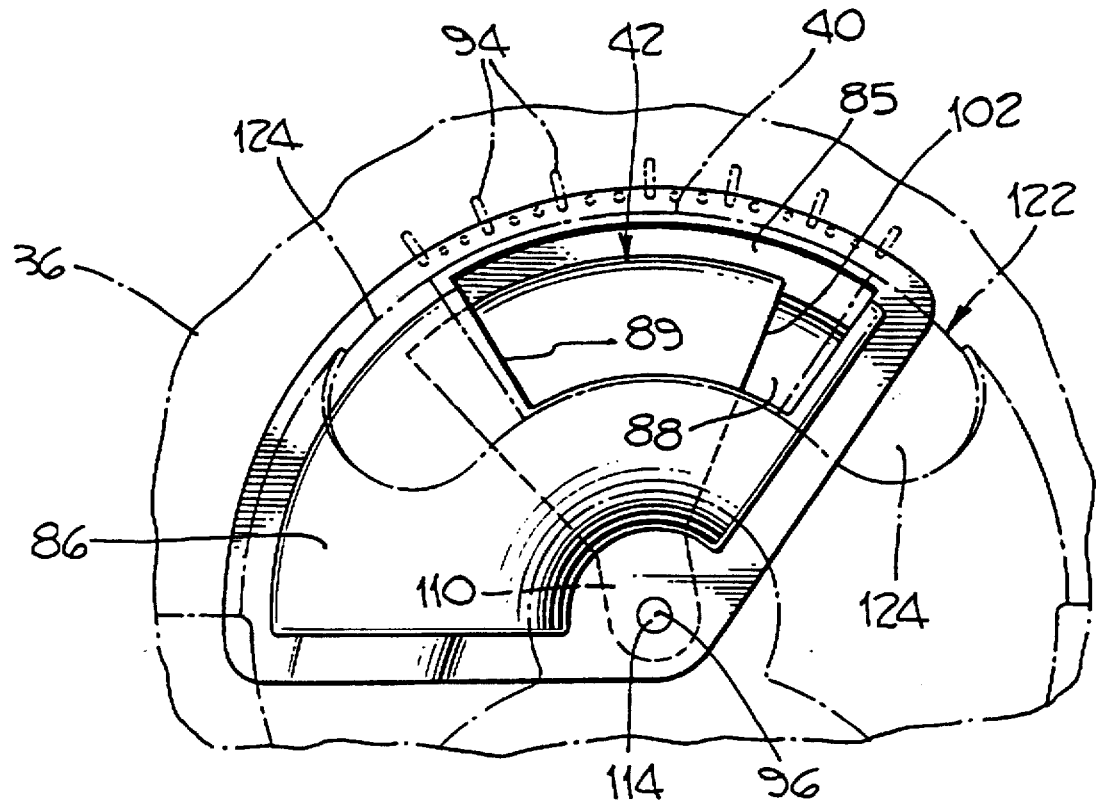
FIG. 8 depicts a frontal perspective view of the pressure indicating means.

FIG. 8 depicts an enlarged view of a portion of the facing plate 38 as well as the lens 40, and illustrates the position of the indicator means 42 when the bellows 84 is pressurized in a manner similar to the cutaway perspective view of FIG. 7. In FIG. 8, the pressure can be determined versus the indicator marks 94, by the positioning of the indicator means 42. Thus, the pressure within the bellows 84 corresponds to approximately the fifth dash-mark on the indicator marks 94. Following placement of the athletic shoe 20 upon the foot of the wearer and tieing of the laces thereof, the pressurization of the bladder means 52 and bellows 84 causes the indicator means 42 to traverse the partially toroidal chamber 88 behind the lens 40 and opening 89. Thus, by determining the appropriate fit for the shoe, the user can pump up the inflatable bladder and bellows 84 to a fixed level, as illustrated for example by the level shown in FIG. 8, in order to provide a consistent fit between subsequent uses of the athletic shoe 20.

Figure 9:
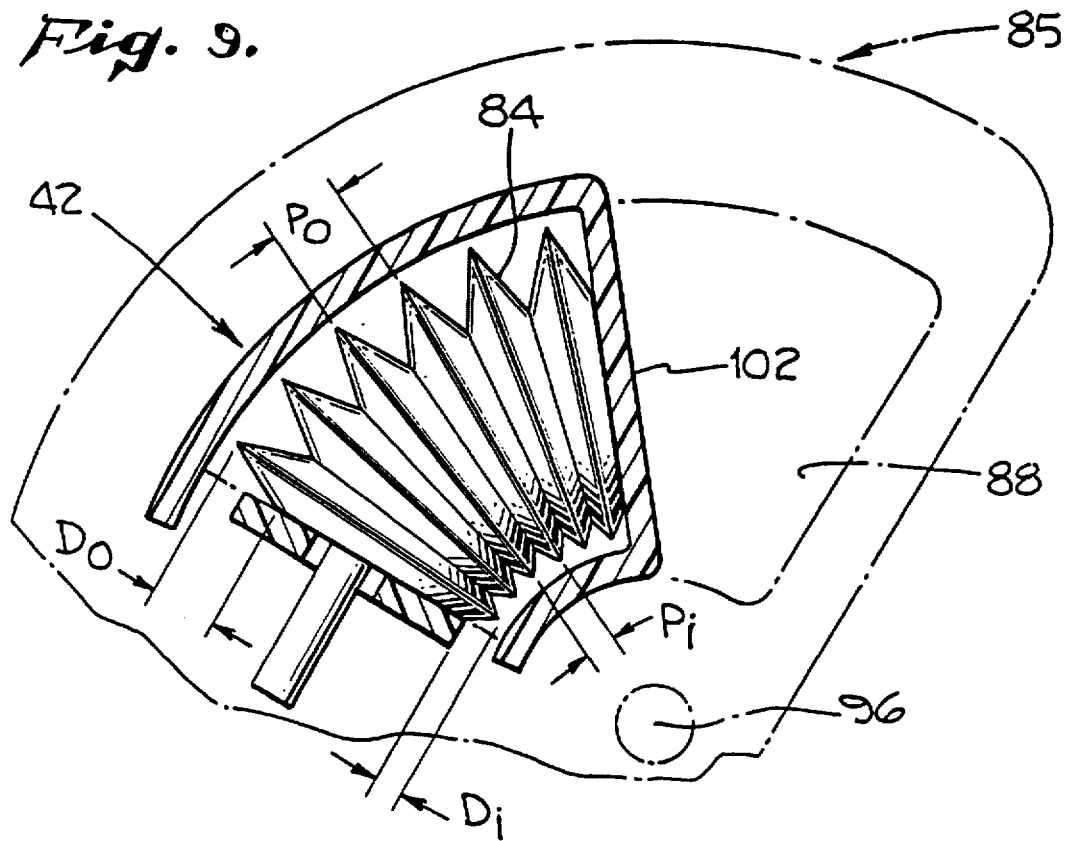
FIG. 9 depicts a detailed view of the arcuately expanding bellows shown in a semi-inflated state.

FIG. 9 depicts in greater detail the operation of the arcuately expanding bellows 84. As may be appreciated from the illustration of FIG. 9, the arcuately expanding bellows 84 is specifically designed to include a smaller depth and pitch for the pleats along one side, i.e. the radially internal portions, than at the other side, i.e. the radially external portions. By this configuration, the arcuately expanding bellows 84 tends to expand and contract in a more nearly arcuate manner, as illustrated in FIG. 10, thereby reducing the amount of friction between the bellows and the walls defining the chamber in which it expands, as compared to using a linearly expanding type of bellows in an arcuate chamber.

Figure 10:
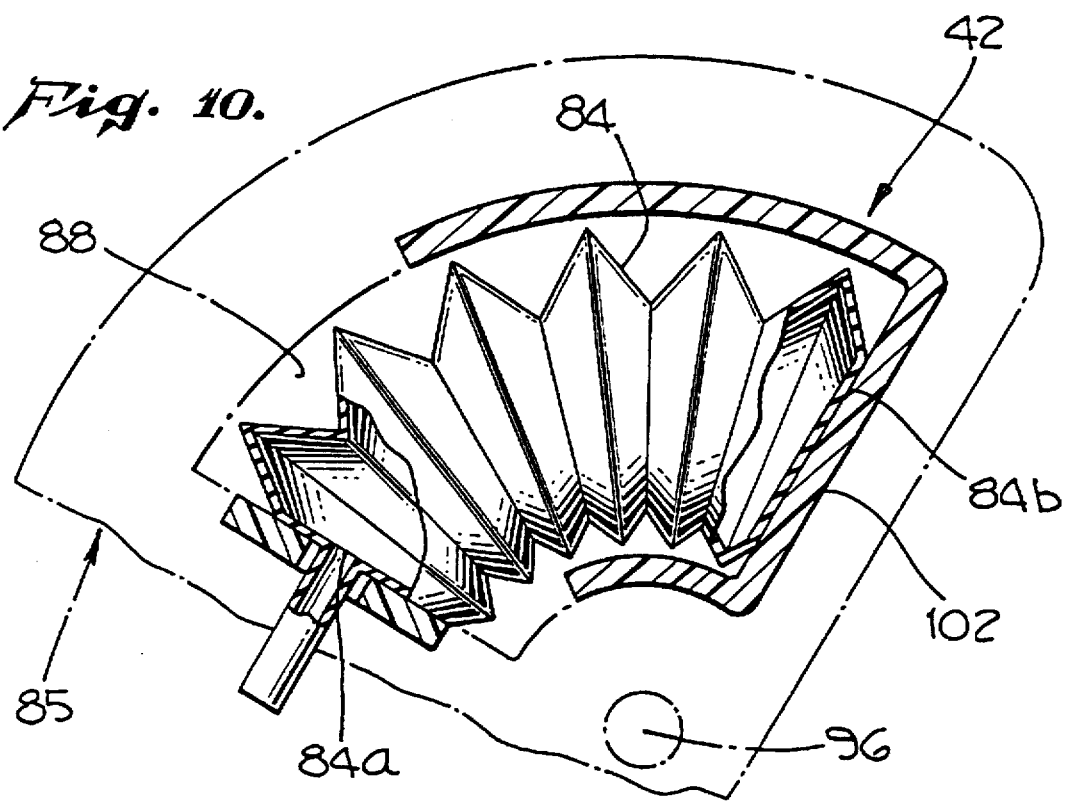
FIG. 10 depicts a view similar to that shown in FIG. 8 of the arcuately expanding bellows, shown as fully expanded.

The radially expanding bellows 84 of FIGS. 9 and 10 is specifically designed to expand and contract in an arcuate manner. When deflated, bellows 84 has a generally cylindrical configuration, including a plurality of individual pleats defined by the pitch and depth thereof. As may be appreciated from the illustration of FIG. 10, the pitch (P) of the pleat at the radially inner portion of the bellows (Pi), is less than the pitch at the radially outer portion (Po). In addition, the depth (D) of the pleat at the radially inner portion (Di) is less than the depth of the pleat at the radially outer portion (Do). This combination of having a reduced pleat pitch and depth at one side as opposed to the opposite side causes the bellows to expand in the more nearly arcuate manner described above upon inflation. By this configuration, an arcuately expanding bellows can be used to display pressure using an arcuate, graded gauge. This particular configuration for a bellows pressure indicating means has not, heretofore, been available.

Having detailed the specific elements comprising the pressurizing means 36 of the athletic shoe 20 of the present invention, it may also be instructive to describe the operation of the pressurization means following placement of the athletic shoe 20 on the foot of the wearer. Following insertion of the foot into the shoe 20, the laces of the shoe 20 will be securely tied to determine a first level of comfort or fit for the wearer. Following securing of the laces, the pump is utilized to inflate the bladder means 52 as well as to bias the pressure sensing means 80 measuring the pressure within the bladder means 52. The means for indicating the sensed pressure 82 is referred to by the wearer in order to allow the wearer to inflate the bladder to a desired pressure level, which corresponds to the desired fit for the particular type of athletic activity in which the user is to engage. The means for indicating the sensed pressure 82 provides the visual reference allowing the user to readily select the particular comfort level, as well as the snugness of fit of the athletic shoe 20, to which the user has become accustomed for a particular athletic event. By this arrangement, following an initial trial and error period to determine the appropriate snugness and fit for the athletic shoe 20, the user will be able to rapidly place the shoe 20 on his or her foot and adjust the fit and snugness to the desired level.

The pressure sensing means 80 preferably entails inflating the arcuately expanding bellows 84, which, in turn, causes the indicator means 42 to traverse an arcuate path beneath a reference indicia, such as indicator marks 94, and the visually transparent lens, which allows the user to determine the pressure setting based on the positioning of the indicator as against the indicia. In the case where the indicia has some type of numeric display associated with various markings on the indicia, a numeric representation of the pressure and comfort or snugness can be obtained. Thus, the user could refer to the pressure indicating means to determine a numeric value for the pressure of the air bladder contained within the shoe.

Having detailed above the exemplary preferred embodiment for the configuration of the present invention, it will be appreciated that alternative embodiments and configurations will be readily apparent to those skilled in the art.

Accordingly, it is expected that the proper scope of the present invention will not be measured against the specification and drawings, but only by the proper interpretation of the appended claims.

What is claimed is:

1. A pneumatic pressure indicator comprising:

an inflatable pleated bellows of flexible material having a plurality of pleats, each of said pleats being defined by a pleat pitch and a pleat depth, and wherein said pleat pitch and said pleat depth varies circumferentially from a first pitch and pleat depth along one edge of said bellows to a larger pitch and pleat depth at an opposite circumferential edge of said bellows, whereby said bellows tends to expand in an arcuate manner upon application of a pressurizing force to the interior of said bellows;

encasing means for encasing said bellows, said encasing means defining a partial toroidal chamber; and a graduated indicia of pressure associated with said encasing means, whereby the inflation of said bellows is compared to said indicia to determine the inflation pressure of said bellows.

2. The pneumatic pressure indicator of claim 1, further comprising:

an indicator pivotally disposed in contact with said bellows within said toroidal chamber and pinioned to move concentrically therein in response to an expansive urging by said bellows; and spring means disposed in said housing means for urging said indicator in a direction opposite to that urged by said expanding bellows.

3. A pneumatic pressure indicating comprising:

an inflatable, pleated bellows of flexible material having a plurality of pleats, wherein each of said pleats is defined by a pleat pitch and a pleat depth, and wherein said pleat pitch and said pleat depth varies circumferentially from a first pitch and pleat depth along one edge of said bellows to a larger pitch and pleat depth at an opposite circumferential edge of said bellows whereby said bellows tends to expand in an arcuate manner upon application of a pressurizing force to the interior of said bellows;

encasing means for encasing said bellows, said encasing means defining a partial toroidal chamber; and a graduated indicia of pressure associated with said encasing means, whereby the inflation of said bellows is compared to said indicia to determine the inflation pressure of said bellows.

* * * * *